United States Patent

Heiman

[15] 3,647,438

[45] Mar. 7, 1972

[54] METHOD OF MAKING HIGH AREA DENSITY ARRAY PHOTOMASKS HAVING MATCHING REGISTRY

[72] Inventor: Frederic Paul Heiman, East Brunswick, N.J.

[73] Assignee: RCA Corporation

[22] Filed: Dec. 29, 1969

[21] Appl. No.: 888,249

[52] U.S. Cl. ....................96/27, 96/116

[51] Int. Cl. ....................G03c 5/04

[58] Field of Search ....................96/27, 44, 116

[56] References Cited

UNITED STATES PATENTS

| | | | |
|---|---|---|---|
| 3,403,284 | 9/1968 | Buck et al. | 315/10 |
| 3,477,848 | 11/1969 | Pritchard, Jr. | 96/27 |

OTHER PUBLICATIONS

Murray et al., " Arrays of Micropixotographs for Microelectric Components," Semiconductor Products, Feb. 1962, pp. 30–32

P. D. Payne, " Technology of Transistor Mask Fabrication," Semiconductor Products, May 1962, pp. 32–36

*Primary Examiner*—Norman G. Torchin
*Assistant Examiner*—Edward C. Kimlin
*Attorney*—Glenn H. Bruestle

[57] ABSTRACT

The method comprises:

printing a master photomask having an array of opaque elements on a photographic photosensitive layer with overexposure;

developing the overexposed photosensitive layer to produce a submaster photomask, the submaster having an array of smaller, opaque elements, and repeating the steps of printing by overexposing and developing a number of times, using the successive submasters in place of the master to produce a subsequent submaster photomask, the subsequent submaster having opaque elements substantially smaller than the elements of the master and having matching registry with the master.

8 Claims, 9 Drawing Figures

INVENTOR.
Frederic P. Heiman
BY
Volker R. Ulbrich
ATTORNEY

METHOD OF MAKING HIGH AREA DENSITY ARRAY PHOTOMASKS HAVING MATCHING REGISTRY

BACKGROUND OF THE INVENTION

The invention relates to the fabrication of matched pairs of registering photomasks for photofabrication of high area density electronic component arrays.

In photofabrication of high area density electronic component arrays, it may be desirable to superimpose the pattern of a first high area density array of elements of a first geometry on the pattern of a second high area density array of elements of a second geometry, while each element of the first pattern is in precise registry with an element of the second. For example, in the photofabrication of a silicon-vidicon target of the general type described, for instance, in U.S. Pat. No. 3,403,284 to T. M. Buck et al. it is desirable to superimpose an array of square contact pads in precise registry with an array of smaller, round P-type dot-shaped regions defined in a silicon wafer. Such a process requires a matched pair of photomasks, one a positive padmask and one a positive dotmask. Each mask is comprised of an array of opaque elements in matching registry with one another. The padmask is comprised of larger, square-shaped, opaque pad elements in a transparent field and the dotmask is comprised of substantially smaller, circular, opaque dot elements in a transparent field. When the padmask is superimposed on the dotmask, each dot of the dotmask must be precisely aligned in the center of a pad of the padmask. In order for this to occur, the mask pair must have precise registry at every point.

Present methods for making matched pairs of registering photomasks include step-and-repeat methods described, for instance by P.D. Payne in "Technology of Transistor Mask Fabrication," Semiconductor Products, Vol. 5, No. 5, p. 32 (May '62). Present step-and-repeat methods, however, are inadequate for making pairs of masks with the element size and shape and the registry that is desired for photofabrication of silicon-vidicon targets. A silicon-vidicon target has a very high area density of diodes; typically, there are 1,500 or more diodes per linear inch. It is found that even with alignment equipment of the highest precision available, the accuracy of alignment during a step-and-repeat procedure is not sufficient to produce a pair of registering photomasks suitable for silicon-vidicon photofabrication because the alignment accuracy is affected by environmental factors such as vibration and slight changes in temperature of the equipment and of the mask plate.

SUMMARY OF THE INVENTION

The novel method for preparing a matched pair of photomasks comprises:

- printing the image of a master photomask having an array of opaque elements on a photographic photosensitive layer by overexposing the photosensitive layer to light passing through the master;
- developing the overexposed photosensitive layer to produce a submaster photomask having an array of opaque elements, the elements of the submaster being in matching registry with the elements of the master and being substantially smaller than the elements of the master. Since by the novel method, one mask is derived from another, registry of the masks is assured without dependence on the reproducibility of mechanical alignment equipment.

PREFERRED EMBODIMENT OF THE INVENTION

Figures 1, 3, 4, 4A, 5, 6, 6A:
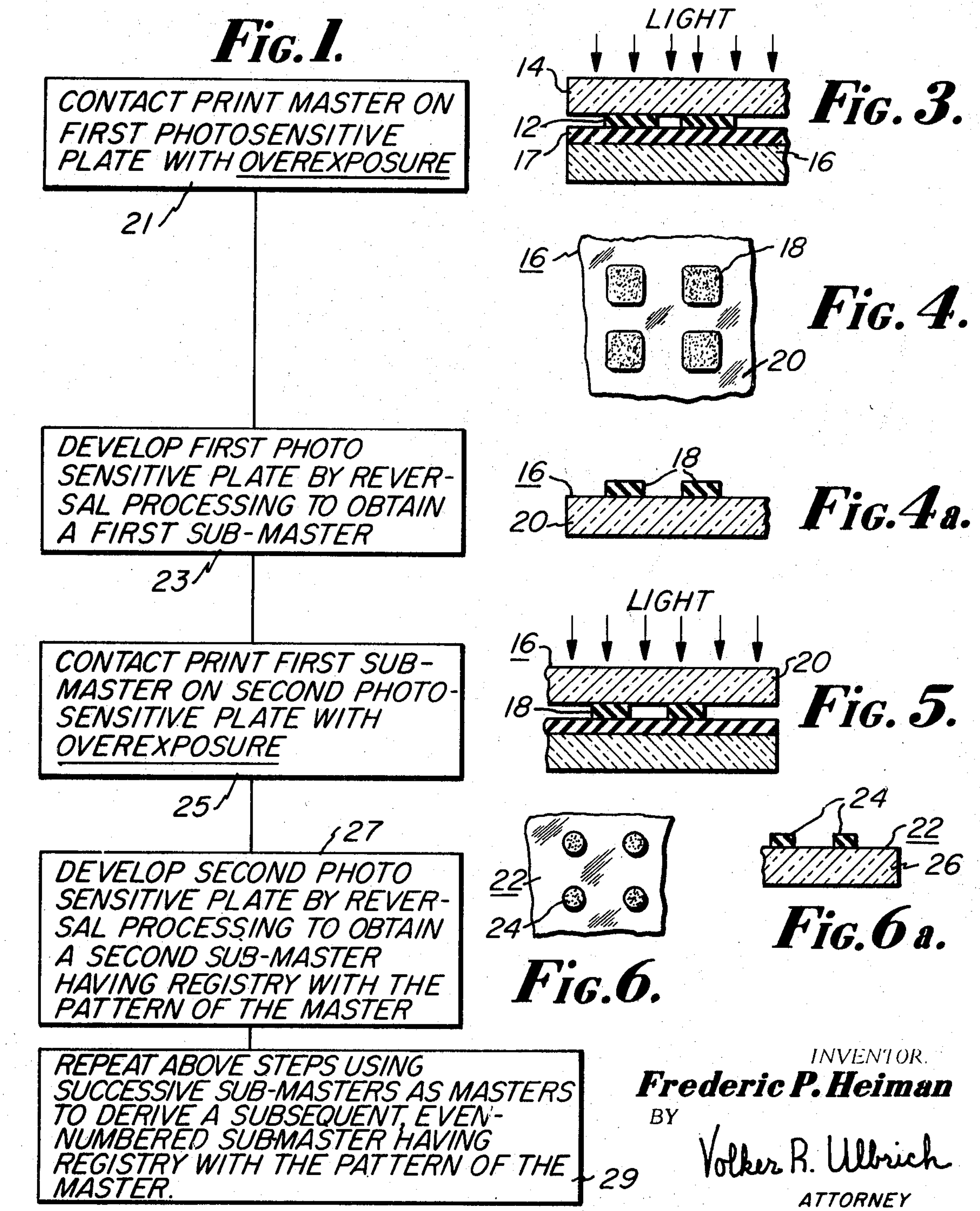
FIG. 1 is a flow chart for a preferred embodiment of the novel process.
FIG. 3 is a sectional view of the photomask fragment of FIG. 2*a* positioned adjacent a photosensitive layer plate and exposed to light.
FIG. 4 is a greatly enlarged plan view of a fragment of submaster photomask derived from the photomask of FIG. 2 by the novel method.
FIG. 4*a* is a sectional view of an edge fragment of the photomask of FIG. 4.
FIG. 5 is a view of the fragment of FIG. 4*a* positioned adjacent a photosensitive layer plate and exposed to light.
FIG. 6 is a greatly enlarged surface view of a fragment of a subsequent submaster photomask derived from the submaster photomask of FIG. 4 by the novel method.
FIG. 6*a* is a sectional view of the photomask of FIG. 6.

In the preferred embodiment shown in FIG. 1, a padmask for defining contact pads of a silicon-vidicon target is used as a master photomask to derive an even-numbered, submaster dotmask for defining smaller P-type impurity regions centered under the contact pads of the target.

Figure 2:
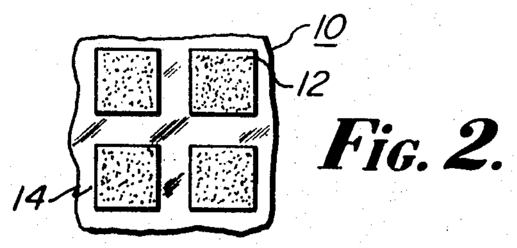
FIG. 2 is a greatly enlarged plan view of a fragment of an original master photomask having opaque, square-shaped elements and utilized in the preferred embodiment of the novel method.
Figure 2A:
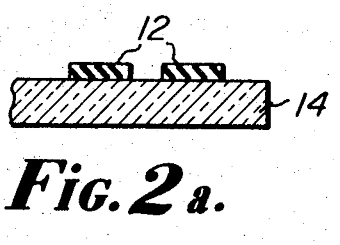
FIG. 2*a* is a sectional view of an edge fragment of the photomask of FIG. 2.

The master padmask 10, a portion of which is shown in FIGS. 2 and 2*a*, is a ruling of opaque, square indium pads 12 on a transparent glass substrate 14. The ruling is made by evaporating a thin layer of indium on the substrate 14 and then ruling off lines of indium with a ruling engine. The pads 12 of the padmask 10 are about 0.5 mil on a side and spaced from one another by a distance of about 0.15 mil. There are about 1,540 pad elements per linear inch.

In the first step 21, the padmask 10 is used as a master photomask to contact print a pattern on a glass plate 16 carrying a layer 17 of "Kodak High-Resolution" photosensitive silver halide emulsion by the novel method according to the flow chart of FIG. 1. The emulsion plate 16 is marketed by the Eastman Kodak Co. of Rochester, N.Y. The emulsion carried on of the plate 16 is about 6 microns thick when unexposed. The original master padmask 10 is placed in direct contact with the photosensitive emulsion layer 17 plate at room temperature in a vacuum frame, as shown in FIG. 3, and overexposed for a period of about 2 milliseconds with blue light. The light is about 50 percent more intense than the normal exposure intensity which would result in maximum fidelity of the reproduced image.

In the next step 23, the overexposed photosensitive plate is processed by direct reversal processes as follows: The processing chemicals, marketed by the FR Corp., Bronx, N.Y. are maintained at about 68° F. during the processing. The exposed emulsion plate is immersed in a first, high-contrast developer, "FR" formula FR-CR1, for 110 seconds and then rinsed with water. It is thereafter bleached for 110 seconds in a bleaching solution, FR-CR2, rinsed with water, and immersed in a clearing solution, FR-CR3, for 55 seconds. After another rinse with water, the layer 17 is given a second light exposure in which the entire layer 17 is flooded for approximately 15 seconds with light from a 1,000-watt sodium-iodine lamp 26 inches distant from the layer 17. After the second light exposure, the plate is immersed in a second developer, FR-CR4, for 55 seconds, rinsed with water, and immersed in an acid hardening-fixing solution, "Kodak Rapid Fix" marketed by the Eastman Kodak Co., Rochester, N.Y., for 30 seconds. Thereafter, the plate is rinsed with water and dried with ethyl alcohol. The resulting plate is a first submaster photomask 16 as shown in FIGS. 4 and 4*a*. It is an array of generally square-shaped, opaque pads 18 of developed emulsion on a transparent substrate 20. However, because of the scattering effects of the exposure light due to overexposure of the photosensitive plate, the pad elements 18 of the submaster 16 are about 30 percent shorter on a side than the pads 12 of the original master 10 and have rounded corners.

The above contact printing and developing steps are repeated, using the first submaster 16 as master, as shown in boxes 25 and 27 of FIG. 1 and in FIG. 5, to obtain a second submaster. The elements of the second submaster are roughly 25 percent shorter on a side than those of the first submaster and have even more rounded corners than those of the first sub-master. The contact printing and developing steps are again repeated, as shown in box 29 of FIG. 1, this time using the second submaster as master to obtain a third submaster, and so on, until a final even-numbered submaster 22 shown in FIGS. 6 and 6*a* is derived by this successive repetition of the contact printing and developing (odd-numbered submasters by contact printing are nonregistering mirror images). The final submaster 22, shown in FIGS. 6 and 6*a*, is a fourth submaster and has elements 24 which are essentially round dots 24 on a transparent substrate 26. The dots 24 are considerably smaller than the pads 12 of the original master 10. Whereas the pads 12 are on the order of 0.5 mil on a side, the dots 24 are only about 0.15 mil in diameter. The dots 24 are also in precise registry with pads 12 of the original master 10, since they were derived from it. Thus, the original padmask 10 and the derived padmask 22 constitute a matching pair of photomasks having precise registry and having unlike elements.

When a submaster is used for contact printing, it is turned about-face from the position in which it was itself exposed. In this way, the opaque elements of the submaster are brought in direct contact with the photosensitive plate to assure good definition. Because of the reversed orientation, each submaster is a mirror image (except for size and shape of the elements) of the mask used to derive it directly. Because of this reversing, only even-numbered submasters will register with the original master, since they have been reversed an even number of times.

The matching dotmask 22 and padmask 10 are used to define arrays on a silicon-vidicon target generally as follows: A thin N-type silicon target wafer is covered on one surface with a layer of silicon oxide. The oxide layer is covered with a coating of negative photoresist. The dotmask 22 is used to expose the photoresist coating. After exposure of the photoresist coating, the unexposed photoresist is removed to bare dot-shaped areas of the oxide layer. The bare areas of the oxide layer are etched away with hydrofluoric acid to bare an array of dot-shaped wafer surface regions. The photoresist is removed. Then, P-type impurities are diffused into the discrete regions of the wafer surface to form PN junctions.

Following the diffusion, a layer of conducting contact pad material, such as degenerate P-type silicon, is formed over the entire surface. The conducting layer is covered with a coating of positive photoresist. The padmask 10 is aligned with depressions in the conducting layer corresponding to openings for the P-type regions so that every P-type region is exactly centered in a square pad 22 of the padmask 10. The positive photoresist coating is exposed through the padmask 10 and the exposed photoresist removed to bare a grid of the conducting layer. The grid is etched away to form the conducting layer into square contact pads on each P-type region overlapping a portion of the silicon oxide immediately surrounding the P-type region. Square pads have been found more suitable for some purposes than round pads, since they can be packed more densely on the target surface. The square-shaped pads are registered precisely with the dots at every point on the target, thereby increasing signal uniformity of the target.

General Considerations

In conventional photographic processes for making copies or negatives of an existing photomask, it is desirable to have the submaster be as much as possible like the master. In the novel method, it is desirable that the submaster be unlike the master with respect to both the size and the shape of the elements, while complete registry (spatial relationship) of the elements with the elements of the master is preserved. The elements of the submaster are more circular and smaller than those of the master. By the novel process, corresponding elements of any noncircular configuration in the master may be made more circular and smaller in the derived submaster.

The number of contact printing repetitions necessary to make a desired pair of masks depends, among other things, upon the degree of overexposure, the particular photographic emulsion used, the wavelength of the exposure light, and the difference in size of the elements of the masks. A range of overexposure from about 5 percent to about 100 percent is acceptable for adjusting the desired extent of reduction. The degree of overexposure should be high enough that a reasonable number of printing repetitions will yield the desired size reduction in the elements, but not so high that the border definition of the elements is degraded.

The degree of overexposure of a photosensitive layer is proportional to the product of the intensity of the exposure light at the layer and of the time for which the light is incident on the layer. Thus, a bright light, on for a short time, can result in generally the same exposure as a dimmer light, on for a longer time. Generally, in photographic reproduction work, it is desired that the unexposed portions of the photosensitive layer correspond with maximum fidelity to the photomask pattern. To obtain maximum fidelity, a correct or "normal" exposure must be determined. Normal exposure varies with the distance of the light source from the photosensitive layer, the temperature of the photosensitive layer, the wavelength of the light source, and the sensitivity of the photosensitive layer used. Even for photographic emulsion plates obtained commercially from a single source, there are variations in sensitivity. Thus, it is common practice to determine normal exposure time by making trial exposures with emulsion plates of a group until maximum fidelity is achieved. Maximum fidelity is indicated by good edge definition and an element size equal to the element size of the photomask used. For the preferred embodiment of the invention, the light source was a xenon lamp flashed for about 2 milliseconds by means of associated capacitive circuitry. A variable voltage transformer was used to regulate the input voltage to the capacitive circuitry, so that although the flash time of between abut 1 and 5 milliseconds remained relatively constant, the intensity of the flash could be changed to vary the exposure. The output was measured with a photocell sensing device. It was found that the exposure was an approximately linear function of the square of the input voltage from the transformer, and this voltage was used to adjust the degree of overexposure.

The novel method may be used with photopolymers such as "Shipley 1350" made by the Shipley Co., Inc. of Wellesley, Mass., "Kodak Autopositive Resist Type 3" made by the Eastman Kodak Co. of Rochester N.Y., or other positive high-resolution photoresist. Photoemulsions such as silver halides or diazonium salts which are capable of high-resolution work are also suitable. High-resolution photographic techniques and materials are discussed in detail, for instance, in *Microphotography*, 2nd ed., by G.W.W. Stevens (New York: John Wiley & Sons, Inc., 1968), pages 15–63, 89–99, and 475–482. Further details of photographic processing as exemplified by the preferred embodiment may be found in the photographic literature, such as in "Photo-Optical Aspects of Mask Technology," by J. N.Y., Altman, *Solid State Technology*, Vol. 12, No. 7, p. 34, July '69), and in the references cited therein.

The photosensitive emulsion plate of the preferred embodiment is sensitive to ultraviolet, blue and green light. Ordinarily, a green light is used to expose such an emulsion plate, in order to minimize scattering of the light. However, for the preferred embodiment, it is advantageous to use blue light to increase the scattering. The change in geometry and reduction in size of the elements is believed to be due to Rayleigh scattering of the exposing light in the emulsion. Any geometry, including circles, is reduced in size, but only noncircular elements result in changed shape, since there is a tendency toward the circular shape in the process. The degree of scattering increases with decreasing wavelength. Thus, the use of shorter wavelength blue light increases scattering and permits the dotmask to be made with fewer printing steps.

In order for elements of the submaster to have the same spatial relationship as the elements in the prior submaster and the master, it is necessary that the support for the photographic emulsion or photopolymer be dimensionally stable. To this end, glass is preferred. However, other transparent substrates, such as sheets of acrylic plastic, may also be used.

I claim:

1. A method for preparing a matched pair of photomasks comprising, a. printing the image of a master photomask having an array of opaque elements on a photographic photosensitive layer with an exposure which is substantially greater than a normal exposure which would give maximum fidelity of reproduction of said elements of said master;

b. developing said exposed photosensitive layer to produce a submaster photomask having an array of opaque elements, said elements of said submaster being in matching registry with said elements of said master and being substantially smaller than said elements of said master;

c. repeating of said printing and developing steps at least once, using successive submasters derived therefrom in place of said master to produce a subsequent, submaster photomask, the elements of said subsequent, submaster being in registry with said elements of said master and being substantially smaller than said elements of said master.

2. A method for preparing a matched pair of photomasks, comprising, contact printing the image of a first master photomask having an array of opaque elements on a first photographic photosensitive layer with an exposure which is substantially greater than a normal exposure which would give maximum fidelity of reproduction of said elements of said master;

developing said exposed first photosensitive layer to produce a first submaster photomask having an array of opaque elements, the elements of said first submaster being substantially smaller than said elements of said master, and repeating said contact printing and developing steps an odd number of times, using successive submasters derived therefrom in place of said master to produce an even-numbered, subsequent, submaster photomask having matching registry with said master, the elements of said even-numbered subsequent submaster being substantially smaller than said elements of said master.

3. A method for preparing a matched pair of a positive padmask and a positive dotmask, each being comprised of an array of elements in matching registry with one another, said padmask being comprised of opaque pad elements in a transparent field and said dotmask being comprised of substantially smaller dot elements in a transparent field, said method comprising:

positioning a positive padmask master photomask having an array of opaque elements on a transparent support adjacent to, and in parallel relationship with, a first photographic photosensitive layer on a transparent substrate;

contact printing said master on said first photosensitive layer by overexposing said first photosensitive layer to light passing between said elements of said master;

developing said exposed first photosensitive layer to produce a first submaster dotmask having an array of opaque elements, the elements of said first submaster being substantially smaller than said elements of said master, and repeating said positioning, contact printing and developing steps an odd number of times, using successive submasters derived therefrom in place of said master to produce an even-numbered, subsequent, positive submaster dotmask having an array of opaque elements in matching registry with said positive padmask master, the elements of said even-numbered subsequent positive dotmask being substantially smaller than said pad elements of said padmask master.

4. The method defined in claim 3 and wherein said pad elements of said master are polygonal and the elements of said dotmask are substantially circular.

5. The method defined in claim 3 and wherein said contact printing step includes exposing said photosensitive layer with an exposure of between about 5 percent and 100 percent greater than a normal exposure time.

6. The method defined in claim 4, and wherein said contact printing step includes exposing said photosensitive layer for an approximately 50 percent greater exposure than a normal exposure.

7. The method defined in claim 2 and wherein said contact printing is with a light source whose light is of such a wavelength that a substantial degree of scattering of said light occurs in said photosensitive layer.

8. The method defined in claim 5 and wherein:

said contact printing step includes exposing said photoresist layer for approximately 50 percent greater exposure than said normal exposure;

said photosensitive layer is a high-resolution silver halide emulsion on a transparent plate, and said light consists essentially of wavelengths of 5,000 Angstroms or shorter.

* * * * *